Nov. 6, 1962 D. W. FAUDRÉE 3,061,947
APPARATUS FOR TEACHING AND LEARNING BASIC ARITHMETIC
Filed Sept. 8, 1960 4 Sheets-Sheet 1
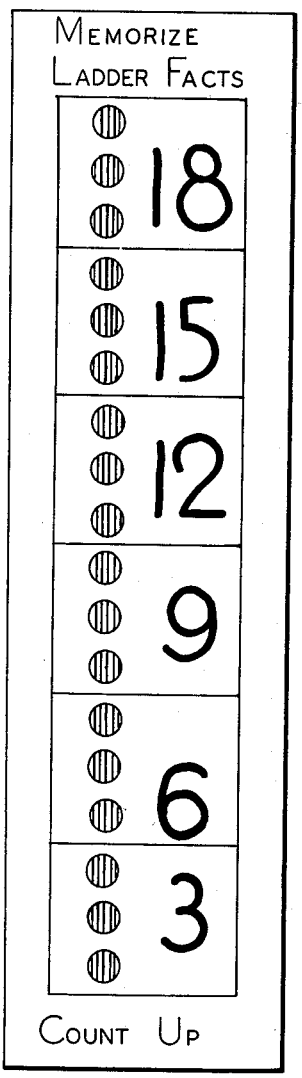
FIG. 13
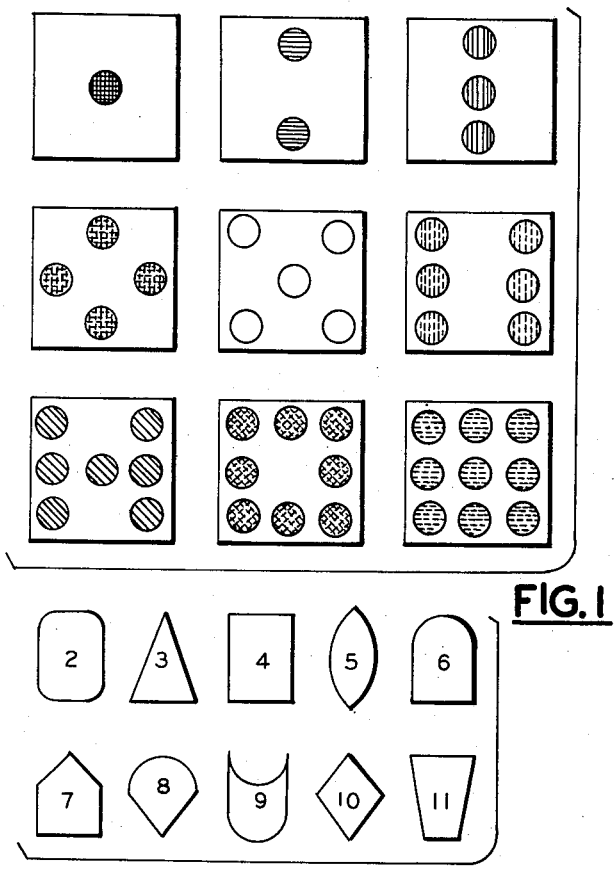
FIG. 1
FIG. 2
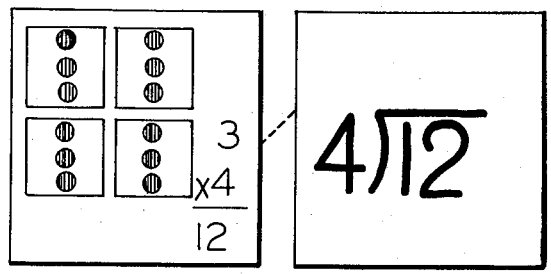
FIG. 12
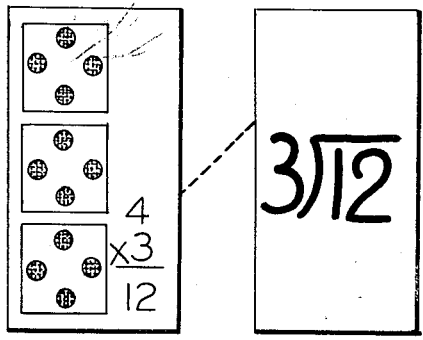
FIG. 11
*INVENTOR.*
DORIS W. FAUDRÉE
BY James R. Head
ATTORNEY Nov. 6, 1962 D. W. FAUDRÉE 3,061,947
APPARATUS FOR TEACHING AND LEARNING BASIC ARITHMETIC
Filed Sept. 8, 1960 4 Sheets-Sheet 2

*INVENTOR.*
DORIS W. FAUDREE

BY James R. Head
ATTORNEY

Nov. 6, 1962 D. W. FAUDRÉE 3,061,947
APPARATUS FOR TEACHING AND LEARNING BASIC ARITHMETIC
Filed Sept. 8, 1960 4 Sheets-Sheet 3

*INVENTOR,*
DORIS W. FAUDRÉE
BY James R. Head
ATTORNEY

Nov. 6, 1962        D. W. FAUDRÉE        3,061,947

APPARATUS FOR TEACHING AND LEARNING BASIC ARITHMETIC

Filed Sept. 8, 1960        4 Sheets-Sheet 4

*INVENTOR,*
DORIS W. FAUDRÉE

BY *James R. Head*
ATTORNEY

United States Patent Office 3,061,947
Patented Nov. 6, 1962

3,061,947
APPARATUS FOR TEACHING AND LEARNING BASIC ARITHMETIC
Doris W. Faudrée, 1911 S. Jamestown, Tulsa, Okla.
Filed Sept. 8, 1960, Ser. No. 54,624
4 Claims. (Cl. 35—31)

This invention relates to apparatus useful in teaching and learning basic arithmetic. More particularly, the invention relates to the use of representative symbols, colors and contrasts for teaching and learning arithmetic.

It is a primary object of this invention to provide teaching apparatus and methods which emphasize relationships and organization in the teaching of basic arithmetic to early grade students, such as first, second and third grades.

Another object of this invention is to provide apparatus for use in teaching and learning basic arithmetic which is meaningful and of interest to the child.

Another object of this invention is to provide a system, and apparatus for use of that system, in teaching basic arithmetic wherein elementary number and combinations of numbers relationships can be understood and remembered.

A still further object of this invention is to provide apparatus for use in teaching and learning basic arithmetic which is particularly useful in extra-curricular drills.

A yet still further object of this invention is to provide a system and apparatus for use in that system of teaching and learning arithmetic which permits children of the early ages to develop meaningful ideas of single groups of numbers and combinations of numbers as used in the addition, subtraction, multiplication and division processes.

A yet additional object of this invention is to provide apparatus for teaching and learning basic arithmetic which presents basic arithmetic facts in an arrangement of colors, contrasts, and geometric design which will provide motivation and association relationships to the basic arithmetic problems of the early grades.

An even further object of this invention is to provide, printed material, objects, and devices for accomplishing the above aforesaid objects.

Another object of this invention is to provide apparatus for teaching and learning basic arithmetic which is applicable to a game for individuals or groups of individuals.

These and other objects of this invention will become more apparent upon further reading of the specification and claims when taken in conjunction with the following illustrations of which:

The bracketed sets of FIGURE 1 represent groups of symmetrically arranged and symboled number-sets and corresponding colors which form a basic feature of this invention.

The bracketed shapes of FIGURE 2 represent contrasting outline symbols for further use in this invention in combination with the number facts of FIGURE 1 and which provide basic association relationships for arithmetic results.

FIGURES 11, 12 and 13 are representative of additional arithmetic-fact flash card and charts to teach multiplication and division problems and further indicate usage of the basic concepts of this invention.

DESCRIPTION

Figure 4:
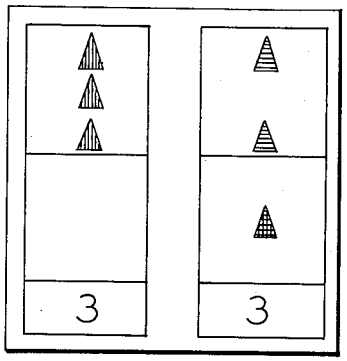
FIGURES 3, 4, 5, 6 and 7 are representative of number-fact charts which utilize the basic concepts of FIGURES 1 and 2 in one form of the invention.

Referring now to the drawings in greater detail. In FIGURE 1, number-sets are represented. For the purpose of this invention the term "number-sets" shall represent a group of symbols, such as circles, squares or other geometric shapes which are used alone or with one or more number-sets to create arithmetic problem facts. Thus the whole fact is presented in part by at least one semi-concrete number.

The symbols shall be symmetrically aligned in each set which, in the preferred embodiment, is a square divided into nine equal areas. For example, as shown, the number-set one (1) is represented by a geometric circle placed in the center of the square or set area; two (2) and three (3) are vertically aligned in each set, etc. These symmetrical relationships in themselves form understanding number experiences for the child. In addition, and in one embodiment, the symbols are colored to form further number relationships for the child. In the preferred embodiment of this invention, the above represented symmetrical pattern and color code is utilized in all embodiments of this invention. The symmetrical color contrasts should be standardized for a particular class. As shown in FIGURE 1 and as is regarded for this particular explanation, the following table of number-color combinations is to be considered typical:

| Numerical representation: | Color code |
| --- | --- |
| 1 | Black |
| 2 | Blue |
| 3 | Red |
| 4 | Yellow |
| 5 | Neutral |
| 6 | Purple |
| 7 | Green |
| 8 | Orange |
| 9 | Gray |

Accordingly it can be seen that the above color-numeral representation and coding system uses basic primary and secondary color combinations which are known and used by students of the early grades.

FIGURE 2, represents an additional embodiment of this invention. Various shapes are used in combination with the color coding and symmetrical pattern system of FIGURE 1 to further assist in the arithmetic association and recall to a child of early grades. Each of the geometric objects is used in indicating an arithmetic result, such as a sum. If a particular arithmetic problem results in the sum of 3, for example, or 13, then the triangular geometric shape is shown. These geometric shapes are of design to indicate basic patterns of objects and shape outlines which are already known to the child and hence further assist the establishment of relationships and mental recall arithmetic.

Figure 5:
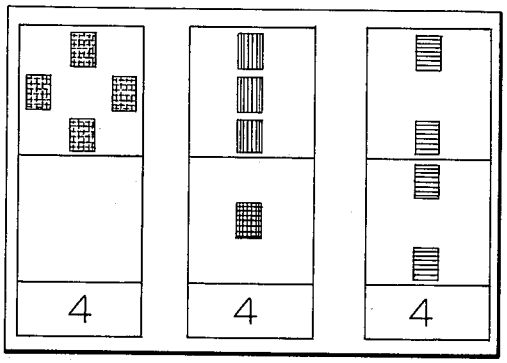

FIGURES 3, 4, 5, 6 and 7 are representative of typical usage of the combined color coding, symmetrical relationship of FIGURE 1 and the shape relationships of FIGURE 2. The addition-result problems 2, 3, 4, 7 and 12 are represented as being placed upon a composite chart for each addition-result. It is to be understood, however, that such use is primarily to show the various combinations of number-facts that will arrive at a given sum or total. For example, in FIGURE 5 are shown the three basic addition arrangements of patterns which will total four (4). In this manner, after the child has discovered the basic combinations of number-facts that go to make up a given mathematical result by using various tangible articles, the chart will help the child remember what he has previously concluded to be true so that the facts do not have to be reasoned through so many times before becoming fixed in his memory. To assist in this fundamental learning process the arrangement of the shapes, colors and pattern play an important part in assisting the child to recall such addition-facts. For example, in FIGURE 3 the various numerical representations for arriving at a sum of 2 is shown. The symbol for the sum of 2 as taken from FIGURE 2 is used in the symmetrical pattern shown in FIGURE 1. In addition they are color coded in accordance with the patterns of FIGURE 1. The relationship of 2+0 will require the upper symmetrical pattern of number-set or group to be in blue, whereas in the card showing 1+1 each of the number-sets is colored black. Each group, however, uses the same shape.

Figure 3:
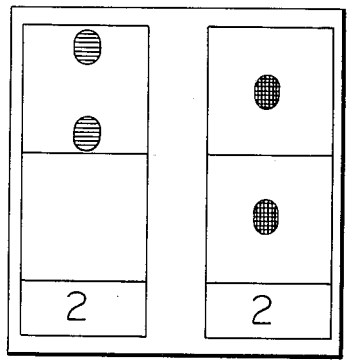
Figure 6:
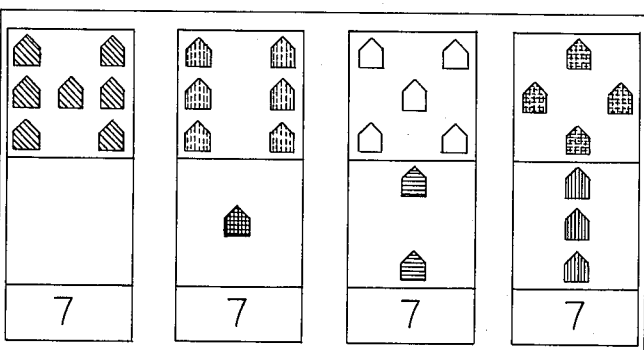
Figure 7:
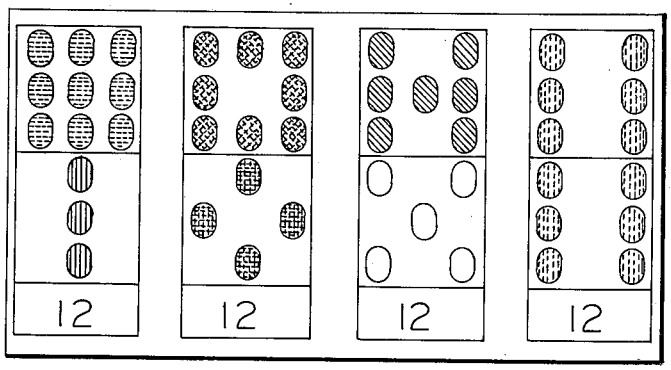

In the further use of this invention, as heretofore described, the general system of number-fact sets and groups of sets, color coding and shapes for arithmetic results is carried into second digit arithmetic sum representations. This is best described in FIGURE 7 where the chart is representative of the various number-facts for the arithmetic sum of 12. The shape outline is the same as that used for the numerical sum of 2 as shown in FIGURE 3 with the color coding in accordance with that described in FIGURE 1.

Although the views of FIGURES 3, 4, 5, 6 and 7 are shown as charts it is to be understood that each group of number-facts may be presented as individual instruction units or cards rather than combined as shown. In this manner only one number-fact (see card 38, FIGURE 8) is presented to the child, challenging him to recall the earlier studied charts.

Figure 8:
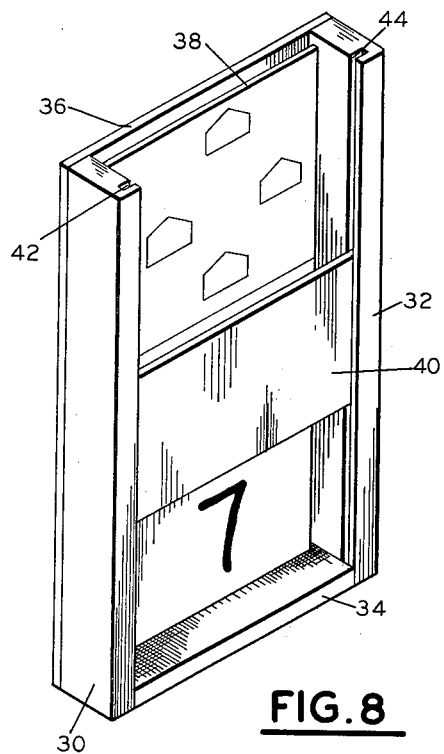
FIGURE 8 is an isometric drawing showing a holder for use with individual card problems.

The isometric view of FIGURE 8 illustrates a type of card holder and teaching aid for use with individual recall instruction cards such as might be described as repeating the views of FIGURES 3, 4, 5, 6 and 7 and divided. Side frames 30 and 32 are held in fixed relationship by bottom piece 34 and back piece 36 and is of such dimension and size to receive instructional cards 38. A slide channel 42 and 44, on the inside of side pieces 30 and 32 respectively, are adapted to receive slide member 40 which may be moved to any one of three positions. In the preferred embodiment of use of the apparatus of FIGURE 8, cards having three spacings of identical width, which is equal to the width of slide 40 are useful herein. As noted before individual cards so dimensionally designed, taken from the charts of FIGURES 3, 4, 5, 6 and 7, can be adaptable to the holder of FIGURE 8. Preferably, however, cards as shown in FIGURES 9 and 10 wherein three separated squares are used for various arithmetic drill processes are used.

When using the holder of FIGURE 8 with the panel in the center position, the child sees the numeral seven and the four yellow houses. He reasons some were taken away. If he can, he recalls "3," if not he may glance at the chart showing addition number-facts. Later, after addition-fact drill, the remainder is covered and the child sees 7—3 and he recalls four (4) houses. The subtract number-fact cards are matched or paired by the child. For example, 7—3 would be paired with 7—4. The result on these two problem-facts recalls to mind the original chart showing combinations of sets. Likewise, the addition cards of related facts are paired by the child. On one side the shape code is not used, thus when the sum is covered by panel or slide 40, the child sees only numerals and disc outlines. He must reason what the total is whereas if shapes of houses were used the answer would now be obvious due to his advance stage of learning.

Figure 9:
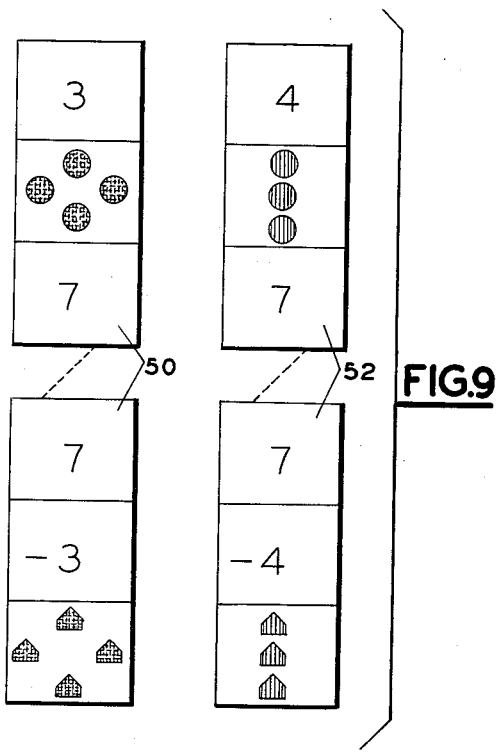
FIGURES 9 and 10 are representative of typical arithmetic-fact cards for use with the holder of FIGURE 8 and represent additional embodiments using the concepts of this invention.

The cards of FIGURE 9 are adapted for higher level arithmetic drill processes wherein the child begins to learn numbers or numerical representations and relationships and is gradually taken away from the object plus color plus domino pattern theme. The cards are printed on both sides to show both arithmetic addition processes and subtraction processes within the same grouping. For example, the first set of cards 50 show on one side thereof the addition of the numeral 3 and the symmetrical pattern for the number-fact set four (4) which is colored (yellow) and which totals 7. On the reverse side of the card the same arithmetic result relationship is used in subtraction of the numeral 3 from the numeral 7 which gives a remainder answer in symmetrical objects plus color. The card 52 shows an additional relationship of number-set facts for the numeral 7. The cards with one face forward at a time are placed in the card holder of FIGURE 8. The instructor then has the freedom of posing several problems to the child by movement of slide 40 to one of the three positions. For example, as shown by the card 38 in the holder the child may be asked "4 + how many will equal 7?" Here the child may be aided by not only the object outline indicating a numeral sum but also the color coding and symmetrical pattern arrangement. As can be readily appreciated other problem questions can be arrived by moving the slide to one of its three positions.

Figure 10:
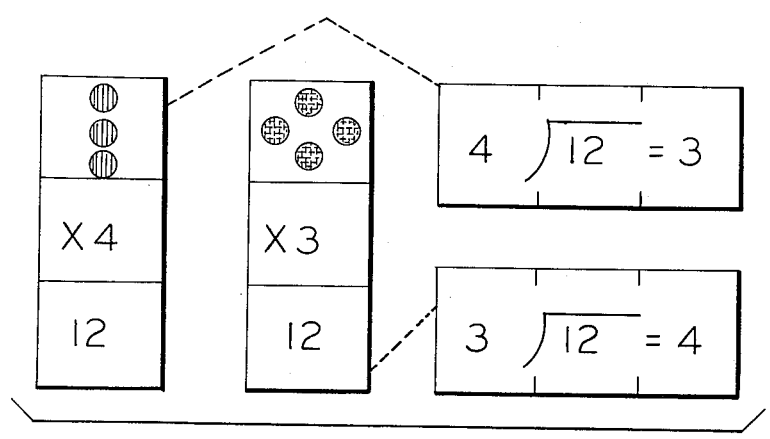

Similary with the cards of FIGURE 10, multiplication and division problems are presented to the children either individually or as a group. These cards are adapted for use with the card holder of FIGURE 8. Each card presents a multiplication problem on one side and a division problem using the same related number facts on the other. In the latter case the card holder may be placed on its side and used in the manner heretofore described.

An additional embodiment of this invention further carrying the theme of symmetrical shaped patterns plus color coding is described in the drill chart apparatus of FIGURES 11, 12 and 13. Here additional cards and charts are shown for representing various drill processes in multiplication and division.

As shown in FIGURE 11 the front of the card will relate to the child the multiplication problem fact of three sets of number facts, each containing four symbols and color coded objects. The arithmetic resultant or total 12 is conveniently placed in a corner of the card so as to be hidden by the hand of the instructor and permit the child to recall his number fact representations to arrive at the answer. Similarly on the card of FIGURE 12 the problem is the reverse of the related multiplication fact 4×3 (FIGURE 12). The reverse operation of the problem fact 3×4 (FIGURE 11) is placed on the reverse side of card 4×3 (FIGURE 12). The card showing 12 divided by 4 can be shown and matched by the child to the card 3×4=12 (FIGURE 11) and the teacher may ask "How many fours in twelve?" The three colored sets illustrate the answer. The opposite side of these cards respectively shows the reverse division problem as it is related to the multiplication problem.

In FIGURE 13 an additional multiplication learning system is shown by the addition or mental building-up of groups of threes (3) which can be used in both addition and multiplication instances.

Figure 16:
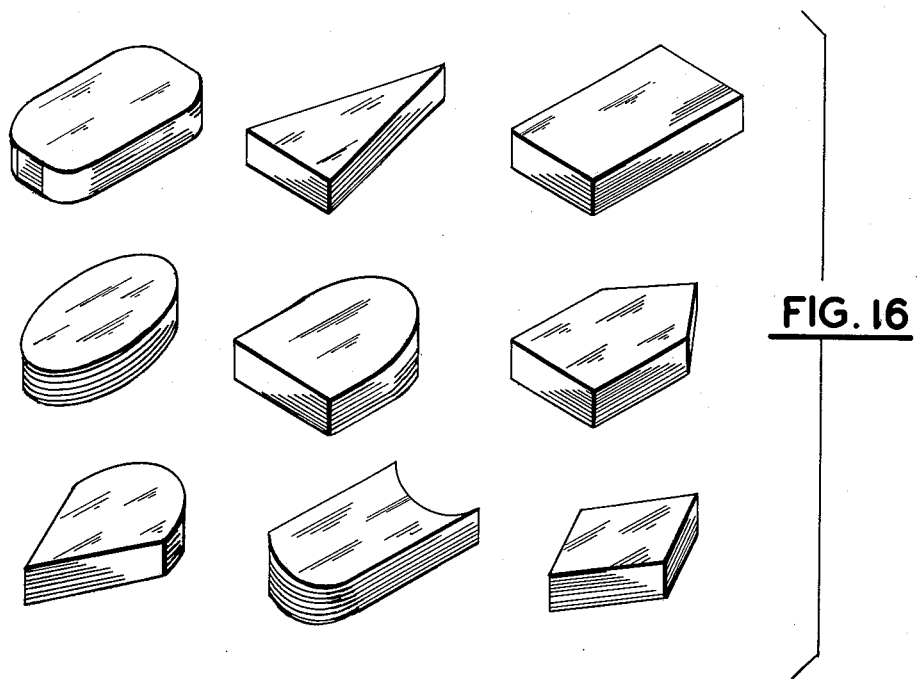
FIGURE 16 represents dimensional geometric objects of FIGURE 2 as shown in isometric, which objects are adaptable in one embodiment to be used with the compartmented box of FIGURE 14.
Figures 14, 15:
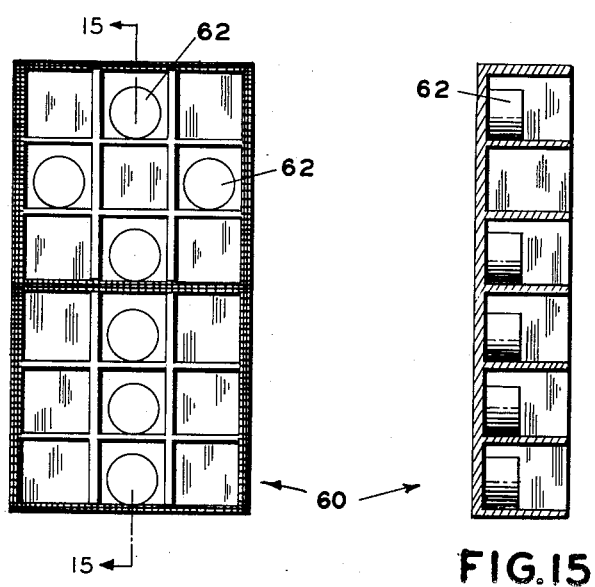
FIGURE 14 is representative of a compartmentized box for use as a drill and teaching element wherein the basic geometric patterns, colors, contrasts and shapes may be utilized to prepare basic arithmetic problems similar to the charts of FIGURES 3, 4, 5, 6 and 7.
FIGURE 15 is a sectional view taken along the line 15—15 of FIGURE 14.

FIGURES 14 and 15 are representative of an additional embodiment of this invention in that it concerns a shadow box for classroom drill and instruction using the symmetrical pattern, object outline shapes, and color relationships as heretofore described, in particular in those views of FIGURES 3 through 7. The box 60 is divided into two parts of nine compartments each. Each part is adapted to permit arrangement of sets (FIGURE 1) for number-facts. A visual separation of the two parts is accomplished by painting the outer edge and middle divisional piece black, as shown. The various compartments are adapted to receive objects such as the circular blocks 62. In addition to the circular blocks, solid blocks representing the objects outline of FIGURE 2 and as shown in isometric in FIGURE 16 can be used, to follow the general theme of this invention as outlined in FIGURES 1, 2 and 3 through 7 and for other charts showing more difficult number facts. In this manner various arrangements of drill and classroom work may be presented to the child with a great deal of flexibility in order to make arithmetic meaningful. It is to be understood that the compartmented box 60 may be adapted for individual use on a smaller scale or enlarged and supported about the classroom or home.

Although the invention has been described with reference to specific and preferred embodiments, it will be apparent, however, that many modifications can be made without departing from the spirit and scope of this invention. For example, it is to be understood that the apparatus, methods and systems as herein outlined for arithmetic drill and classroom study may also be particularly useful as a type of game instruction device. Accordingly this invention should be considered not to be limited to the embodiments herein described, but should be limited only by the scope of the appended claims.

What is claimed:
1. Apparatus for learning arithmetic comprising the combination of a card and card holder; said card having separated groups of number sets to form a number fact result, said sets represented by symmetrically arranged symbols and colors, said symbols of outline shape corresponding to said result; a numeral on said card indicative of said result; cover means slideable with respect to said card and said holder to cover a portion of said card as desired.

2. Apparatus for learning arithmetic comprising the combination of a card and card holder substantially vertically arranged; said card divided into three separated vertical sections, groups of number sets on at least two of said sections which represent a number fact result, said sets represented by symmetrically arranged symbols and colors, said symbols of outline shape corresponding to said result; a numeral on the other of said sections; cover means vertically slideable with respect to said card and holder to cover one of said sections during said learning.

3. Apparatus for learning arithmetic comprising the combination of an arithmetic problem card and card holder; said card having separated sections, numbers on two of said sections which combined represent a number fact result, said result on the other section; opening means for inserting said card into said holder, one side of said holder open to view said sections and a cover means movable along said one side to cover any one of said sections during said learning.

4. Apparatus for use in learning arithmetic from problem cards of the type having number sets on separated sections of said card which combined to make a number fact result also on said card, comprising a framed holder for said card, an opening for inserting said card into said holder, one side of said holder open to view said sections of said inserted card and a cover means movable along said one side to cover any one of said sections during said learning.

References Cited in the file of this patent

UNITED STATES PATENTS

| | | |
|---|---|---|
| 533,216 | Troelltsch | Jan. 29, 1895 |
| 1,244,000 | Soltoft | Oct. 23, 1917 |
| 1,843,183 | Thompson | Feb. 2, 1932 |
| 2,304,893 | Dickson | Dec. 15, 1942 |
| 2,842,870 | Lilly | July 15, 1958 |
| 2,950,542 | Steelman | Aug. 30, 1960 |

FOREIGN PATENTS

| | | |
|---|---|---|
| 165,862 | Switzerland | Feb. 16, 1934 |